United States Patent [19]

Muir

[11] 3,763,463
[45] Oct. 2, 1973

[54] SHRAPNEL SONAR

[75] Inventor: Thomas G. Muir, Austin, Tex.

[73] Assignee: The United States of America as represented by the Secretary of the Navy.

[22] Filed: Sept. 21, 1972

[21] Appl. No.: 291,153

[52] U.S. Cl. .................... 340/1 R, 73/67.7, 340/3 R
[51] Int. Cl. ............................................. G01s 9/66
[58] Field of Search ........................... 340/1 R, 3 R; 73/67.7–67.9

[56] References Cited
UNITED STATES PATENTS
3,613,069  10/1971  Cary, Jr. et al. .................... 340/3 R Primary Examiner—Richard A. Farley
Attorney—R. S. Sciascia et al.

[57] ABSTRACT

The invention provides an unique hand held device including a rotating transducer generating two high frequency signals which cause a nonlinear liquid to generate a low frequency signal which is then projected thru the liquid medium and a low pass filter in such a way as to direct the low frequency sound signal into animal tissue for the purpose of detecting foreign bodies located therein thru a return echo that is displayed on a cathode ray tube mounted in the device.

8 Claims, 3 Drawing Figures

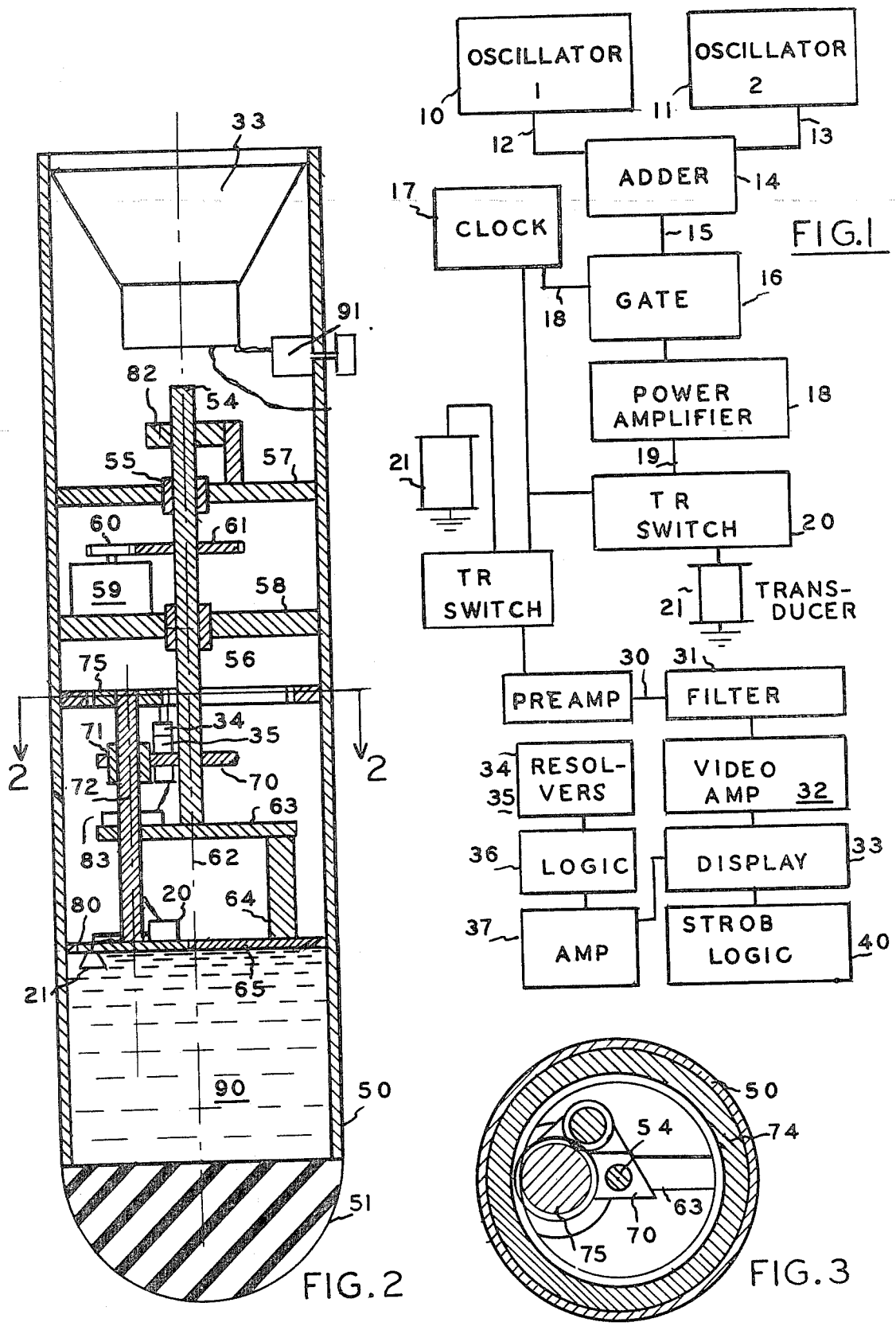

SHRAPNEL SONAR

Methods for detection of foreign bodies in animal tissue are the X-Ray technique and echoencephalographic techniques. Although X-radiation offers a precise method for the location and mapping of foreign bodies, it is potentially dangerous to living cells and it requires the use of large, bulky apparatus as well as photographic processes that are not commensurate with field operations involving ground forces or with operations on the high seas, except on capital ships. The advent of echoencephalographic technology has raised great hopes for an alternative technique. By using ultrasonic radiation in the linear sense, physicians in a few large hospitals have been able to locate objects and structures in animal tissue. The limitations of this method are that to achieve the desired penetration, a relatively crude, low frequency mode of operation must be used; and secondly to electronically store and scan the acquired echo data, a complex logic system is required. Low operating frequencies lead to systems with poor resolution, thereby degrading the accuracy and quality of the detection system. Signal processing techniques have been used to minimize this difficulty but the end result is usually an echoencephalographic system that has to be focused. Focusing leads to resolution limitations brought about by the finite depth of field. Moreover, high speed scanning of both focused and unfocused echoencephalographic systems requires the use of large, on-line computers which are not amenable to field use.

It is therefore an object of this invention to provide an improved device for locating foreign objects in animal tissue.

It is still a further object of this invention to provide means for generating a low frequency acoustical signal to be propagated thru a liquid medium and a low pass filter to animal tissue for the purpose of detecting foreign bodies and particularly metallic foreign bodies in the tissue.

It is yet another object of this invention to provide an improved low frequency sound generator and receiver for locating foreign bodies in animal tissue comprising; a housing having first and second ends, a first rotatable member mounted inside the housing, a second rotatable member mounted on the first rotatable member, a transducer mounted on the second rotatable member, means for rotating the first and second rotatable members, the transducer being moved thereby in a prescribed pattern, means coupled to the transducer causing the transducer to generate the first and second frequencies, a cavity in the housing adjacent to the transducer, the cavity being filled with a liquid wherein the first and second frequencies interact nonlinearly, a low pass filter mounted on the first end of the housing closing one side of the cavity for contacting animal tissue to be scanned and absorbing the first and second frequencies, a cathode ray tube mounted at the second end of the housing, and electrical circuit means connected to the transducer and the display means for causing the display means to depict the position of the transducer in its prescribed pattern and to show any echo signals received from foreign bodies in the tissue.

It is still another object of this invention to provide an improved hand held low frequency sound generator and receiver for locating foreign bodies in animal tissue by generating and receiving low frequency sound signals and projecting the sound signals into animal tissue to be scanned wherein the necessary electronic package is mounted external to the hand held device.

And yet a further object of this invention is to provide a hand held low frequency sound generator incorporating a cathode ray tube and a transducer mounted in a housing whereby a low frequency signal has a generator and echo receiver and display on the hand held tube, whereby an operator can conveniently move the entire device while scanning tissue.

Other objects, advantages and novel features of the invention will become apparent from the following detailed description of the invention when considered in conjunction with the accompanying drawings wherein:

FIG. 1 is a block diagram of one embodiment of this invention.

FIG. 2 is a cross sectional view of the mechanical construction of one embodiment of the invention.

FIG. 3 is a view along the lines 2—2 in FIG. 2.

Generally, the operation includes first and second oscillators 10, 11 coupled thru electrical means 12, 13 to an adder circuit 14. In this circuit the oscillator outputs are combined or summed and transmitted thru connection 15 to electrical gate circuit 16, where they are shaped into short bursts.

Gate 16 is controlled by clock 17 thru connection 18 and the signal from the adders are shaped into short bursts in gate 16 wherein pulse repetition frequencies are pre-determined. The resultant multifrequency bursts are amplified in power amplifier 18 and the signal is in turn coupled to a transmit-receive switch 20 thru connection 19. The switch controls the flow of signal input and output and the transducer 21 is thus controlled. The received echo signal at the transducer 21 is shown coupled back to the T. R. switch 20 to a pre-amplifier circuit 21, thru connection 30 to filter 31, to video amplifier 32 and display device 33. In this case the display device is a cathode ray tube. Output from a pair of resolvers 34, 35 shown as a single block are connected to logic circuit 36, amplifier 37 and to display device 33.

A strobic logic circuit 40 provides the ability to intensify range gated portions of the echo field so as to present the viewer a sagittal section of this field.

FIG. 2 is a cross sectional view of one embodiment of this invention showing a cylindrical housing 50 having a rubber booted hemispherical end section 51. The other end of the housing contains the display device, cathode ray tube 33. A shaft 54 mounted in a pair of bearings 55, 56 is supported in the housing by plates 57, 58. Mounted on plate 58 is an electrical motor 59 driving gear 60 that meshes with gear 61 and provides rotation to shaft 54 about an axis 62.

Shaft 54 is connected to an end plate member 63 connected thru a leg 64 to a rotating plate 65.

Also mounted on shaft 54 is support plate 70 having a bearing 71 for supporting a second shaft 72. A gear 74 rigidly affixed to housing 50, meshes with and drives gear 75 as shaft 54 rotates about its axis.

Shaft 72 drives in a rotating manner transducer plate 80 having transducer 21 mounted therein in a circular hole in plate 65.

Slip rings 82, 83 provide the necessary electrical connection so that transmitter-receiver switch 20 can be actuated for transmitting and receiving the necessary signals to and from transducer 21. Resolvers or position indicators 34 and 35 give an indication of shaft rotation and location in the cycle of operation so that the proper signal may be displayed on the cathode ray tube 33.

The portion of the device between low pass filter or boot member 51 and plates 65, 80 is a cavity 90 and it is liquid filled to couple the signal from transducer 21 to and thru boot 51, the liquid damps out some of the high frequencies. In operation, the outside of boot 51 would be covered with a liquid such as castor oil and placed in contact with animal tissue to be investigated. This provides the proper coupling of signals back and forth. There is additionally shown an intensity control 91 for convenience mounted on the device which may be hand held while investigating the animal tissue.

Obviously many modifications and variations of the present invention are possible in the light of the above teachings. It is therefore to be understood that within the scope of the appended claims the invention may be practiced otherwise than as specifically described.

I claim:

1. An improved low frequency sound generator and receiver for locating foreign bodies in animal tissue comprising:
   a. a housing having first and second ends;
   b. a first rotatable member mounted inside siad housing;
   c. a second rotatable member mounted on said first rotatable member;
   d. a transducer mounted on said second rotatable member;
   e. means for rotating said first and second rotatable members said transducer being moved thereby in a prescribed pattern;
   f. means coupled to said transducer causing said transducer to generate first and second frequencies;
   g. a cavity in said housing adjacent to said transducer, said cavity being filled with a liquid wherein said first and second frequencies undergo nonlinear interaction to produce a highly directive difference frequency radiation;
   h. a low pass filter mounted on said first end of said housing closing one side of said cavity, for absorbing the first and second frequencies and for contacting animal tissue to be scanned;
   i. a display means mounted at the second end of said housing; and
   j. electric circuit means connected to said transducer and said display means for causing said display means to depict the position of said transducer in its prescribed pattern and to show any echo signal received from foreign bodies in said tissue.

2. The improved low frequency sound generator and receiver of claim 1 wherein said display means consists of a cathode ray tube mounted in said second end of said housing and said electrical circuit means are mounted external to said housing and connected thereto by suitable wiring means.

3. The improved low frequency sound generator and receiver of claim 2 wherein said housing is substantially cylindrical in shape and said low pass filter is composed of a rubber booted hemispherical shaped member for absorbing any high frequency sound signals passing thru said liquid.

4. The improved low frequency sound generator and receiver of claim 3 wherein said first rotatable member is driven by electrical means about the major longitudinal axis of said housing.

5. The improved low frequency sound generator and receiver of claim 4 wherein the second rotatable member is driven by a gearing means actuated by rotation of said first rotatable member.

6. The improved low frequency sound generator and receiver of claim 5 wherein there is provided first and second resolvers for indicating the relative position of said first and said second rotatable members by generating an electrical signal coupled to the deflection system of said cathode ray tube to provide a signal trace indicating the path of said transducer.

7. The improved low frequency sound generator and receiver of claim 6 wherein said liquid in said cavity consists of a nonlinear liquid.

8. The improved low frequency sound generator and receiver of claim 7 wherein said electrical circuit means include a strobic logic circuit to intensify range gated portions of the echo field and is a sagittal section of this field.

* * * * *